(12) United States Patent  
Angeletti

(10) Patent No.: US 8,074,758 B2  
(45) Date of Patent: Dec. 13, 2011

(54) INERTIAL CENTRIFUGAL DRIVE SYSTEM

(76) Inventor: Eugene Angeletti, Waynesburg, PA (US)

( * ) Notice: Subject to any disclaimer, the term of this patent is extended or adjusted under 35 U.S.C. 154(b) by 323 days.

(21) Appl. No.: 12/462,326

(22) Filed: Aug. 3, 2009

(65) Prior Publication Data

US 2011/0024216 A1     Feb. 3, 2011

(51) Int. Cl.  
*B60K 6/10* (2006.01)

(52) U.S. Cl. ....................................... 180/165

(58) Field of Classification Search ............. 180/165  
See application file for complete search history.

(56) References Cited

U.S. PATENT DOCUMENTS

| | | | | |
|---|---|---|---|---|
| 1,335,249 | A | * | 3/1920 | Leymarie ........................ 74/342 |
| 3,672,244 | A | | 6/1972 | Nasvytis |
| 3,771,311 | A | * | 11/1973 | Herbst ............................ 60/709 |
| 4,423,794 | A | * | 1/1984 | Beck .............................. 180/165 |
| 4,499,965 | A | * | 2/1985 | Oetting et al. ................ 180/165 |
| 5,244,054 | A | * | 9/1993 | Parry ............................. 180/165 |
| 5,423,406 | A | | 6/1995 | Antonov |
| 5,437,356 | A | | 8/1995 | Lohr |
| 6,253,865 | B1 | | 7/2001 | Suzuki |
| 6,563,509 | B1 | | 5/2003 | Harris |
| 6,755,293 | B2 | | 6/2004 | Jensen |
| 6,955,624 | B2 | | 10/2005 | Brass |
| 7,163,477 | B1 | | 1/2007 | Sherrod |
| 7,311,623 | B2 | | 12/2007 | Masuda |
| 7,392,870 | B2 | | 7/2008 | Kojima |
| 7,410,444 | B2 | | 8/2008 | Groddeck |
| 7,478,693 | B1 | * | 1/2009 | Curtis ........................... 180/165 |

* cited by examiner

*Primary Examiner* — John Walters  
(74) *Attorney, Agent, or Firm* — Theresa M. Seal

(57) ABSTRACT

A inertial-centrifugal drive system retrofitted onto the drive train of existing equipment or incorporated with the power unit/drive train of new vehicles includes a flywheel mounted to the vehicle's drive shaft with the flywheel comprising an outer rim section, a hub and an inner web section connecting the hub to the rim with a free-wheeling cam and clutch bearing encased within the hub and circumjacently mounted on and selectively engagable to the drive shaft adjacent the area of interconnection of the input shaft to the output shaft with the free-wheeling cam and clutch bearing controlled by the flywheel for improving and enhancing the efficiency of any powered rotating force such as the main drive shaft and transmission unit of the vehicle.

5 Claims, 6 Drawing Sheets

INERTIAL CENTRIFUGAL DRIVE SYSTEM

FIELD OF THE INVENTION

The present invention pertains to automotive drive train systems, and more particularly pertains to a drive system that includes an improved flywheel controlled by a freewheeling clutch bearing.

BACKGROUND OF THE INVENTION

Automotive vehicle drive train systems have been in existence for more than a century, and improvements and modifications have been ongoing and continuous. With the current concerns regarding the need for environmentally friendly (eco-friendly) vehicles as well as the concerns regarding the continually rising costs of fuel, improvements to the main components of a powered vehicle, such as to the drive train system, are highly desirable. Improving fuel efficiency, and the attendant reduction in fuel consumption, are crucial in marketing vehicles and making their purchase more desirable for consumers. In addition, improving the efficiency of the drive train system of a vehicle also reduces the wear on the system and reduces the maintenance on the vehicle.

The following patents disclose a variety of drive train systems and medications thereto.

For example, the Nasvytis patent (U.S. Pat. No. 3,672,244) discloses an automotive system utilizing a high velocity, moderate mass flywheel capable of storing and quickly dissipating large amounts of kinetic energy.

The Lohr patent (U.S. Pat. No. 5,437,356)) discloses a centrifugal clutch that includes a pair of clutch shoes and a rotor having drive arms that allows the torque capacity of the clutch to be changed by altering the orientation of the clutch shoes with respect to the drive arms.

The Suzuki patent (U.S. Pat. No. 6,253,865 B1) discloses a driving force transfer system for an automotive vehicle that includes a generator-motor and an engine with a mechanical means to switch between the two.

The Jensen et al. patent (U.S. Pat. No. 6,755,293 B2) discloses an rpm-responsive sprag overrunning clutch that includes a hub, a ring gear, and a plurality of movable sprags that are shiftable into and out of wedging relationship between the hub and the ring gear.

The Brass patent (U.S. Pat. No. 6,955,624 B1) discloses a motor vehicle that includes a drive train utilizing flywheel rotation for storing and releasing energy during acceleration and deceleration depending on the vehicle power requirements.

The Sherrod patent (U.S. Pat. No. 7,163,477 B1) discloses a drive clutch for a CVT that includes a stationary sheave, a movable sheave, a motor and a centrifugal weight system.

The Masuda et al. patent (U.S. Pat. No. 7,311,623 B2) discloses an engine incorporating a v-belt type continuously variable transmission having a drive pulley that is attached to the end of the crankshaft.

The Kojima et al. patent (U.S. Pat. No. 7,392,870 B2) discloses a power module driving control apparatus and hybrid vehicle that incorporates a speed sensing type clutch with the power drive system.

The Groddeck et al. patent (U.S. Pat. No. 7,410,444 B2) discloses a drive unit for a hybrid motor vehicle that includes an internal combustion engine and a dynamoelectric machine connected to the transmission of the motor vehicle.

Nonetheless, despite the ingenuity of the above devices there remains a need for a drive system that will improve the efficiency of any powered rotating force.

SUMMARY OF THE INVENTION

The present invention comprehends an inertial-centrifugal drive system that has both original installation application as well as retrofit application for powered vehicles of all types with especial emphasis and application for the following: aviation industry equipment; military equipment; the shipping industry; the rail and train industry; construction equipment and commercial cranes; farm equipment; the automotive and trucking industry; logging equipment; drilling equipment; mining industry equipment; forklifts and material handling equipment; and recreational equipment. The drive system of the present invention is able to reduce wear on the powered vehicles transmission unit and drive train, reduces fuel consumption by at least 20 per cent, and allows for a smoother recovery of rpms both during acceleration and deceleration. Furthermore, the drive system of the present invention can be retrofitted onto the main drive train of existing equipment or the drive system of the present invention can be incorporated as an integral part of the main drive system of the power unit of the vehicle as an original component.

Thus, the present invention includes a flywheel mounted to the drive train of the vehicle, and specifically to the main drive shaft where the input shaft interconnects to the output shaft. The flywheel includes an outer rim section containing most of the mass of the flywheel, a hub for attachment to the main drive shaft of the vehicle, and an inner web section connecting the hub to the outer rim section. A free-wheeling cam and clutch bearing is mounted on the main drive shaft, and specifically at the interconnection of the input shaft with the output shaft. Furthermore, the free-wheeling cam and clutch bearing is encased within the hub of the flywheel. It should be noted that the flywheel and its component parts, as well as the free-wheeling cam and clutch bearing, are rotatably mounted to the main drive shaft and are circumjacently oriented with respect thereto, and the flywheel is encased in a flywheel housing. A pillow block bearing is mounted on either side of the flywheel housing with one pillow block bearing for the input shaft and one pillow block bearing for the output shaft. Each pillow block bearing houses or encases therein a bearing mounted to that respective part of the main drive shaft, and an oil seal. The free-wheeling cam and clutch bearing is selectively engagable to the main drive shaft to assist in the powering of the vehicle.

It is an objective of the present invention to provide an inertial-centrifugal drive system that includes a free-wheeling cam clutch bearing that will drive in the same direction as the main drive system of the vehicle.

It is another objective of the present invention to provide an inertial-centrifugal drive system wherein the free-wheeling cam clutch bearing will free wheel in breaking mode and thus not interfere with braking.

It is yet another objective of the present invention to provide an inertial-centrifugal drive system wherein the cam clutch bearing will free-wheel in the reverse direction and thus not interfere with the vehicle's directional change.

It is still yet another objective of the present invention to provide an inertial-centrifugal drive system wherein the cam clutch bearing will not interfere with the vehicle's deceleration.

It is still yet a further objective of the present invention to provide an inertial-centrifugal drive system that will assist in power recovery when acceleration is required by the vehicle.

Another objective of the present invention is to provide an inertial-centrifugal drive system that will reduce wear and tear on the vehicle's transmission and drive train.

Still another objective of the present invention is to provide an inertial-centrifugal drive system that will reduce fuel consumption by 20 per cent on all motor vehicle power units.

Still yet another objective of the present invention is to provide an inertial-centrifugal drive system that will allow for the smooth recovery of the rpms of the power unit of the motor vehicle.

Still yet a further objective of the present invention is to provide an inertial-centrifugal drive system that can be retrofitted onto existing equipment such as tractor-trailer, construction equipment, farm equipment, road work and maintenance equipment, etc.

A further objective of the present invention is to provide an inertial-centrifugal drive system that on new equipment is incorporated as an integral part of a transmission or differential.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Figure 1:
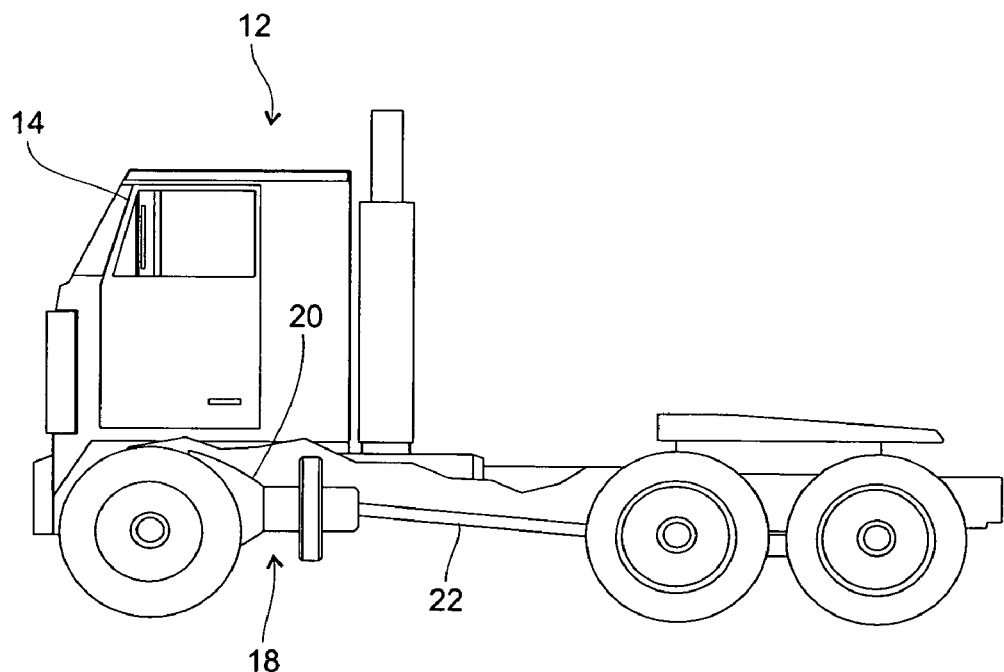
FIG. 1 is a side elevational view of the inertial-centrifugal drive system of the present invention illustrating a piece of equipment—a tractor-trailer—with a standard drive train and transmission unit and the drive system incorporated thereon.
Figure 2:
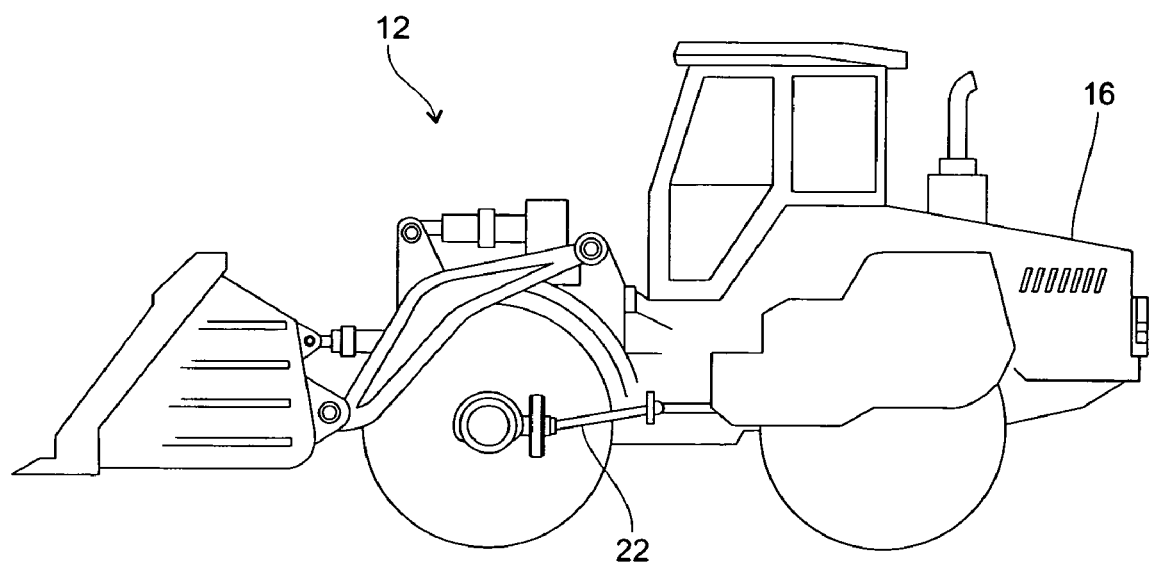
FIG. 2 is a side elevational view of the inertial-centrifugal drive system of the present invention illustrating another piece of equipment—a front-end loader—having a standard drive train and transmission unit and the drive system incorporated thereon.
Figure 3:
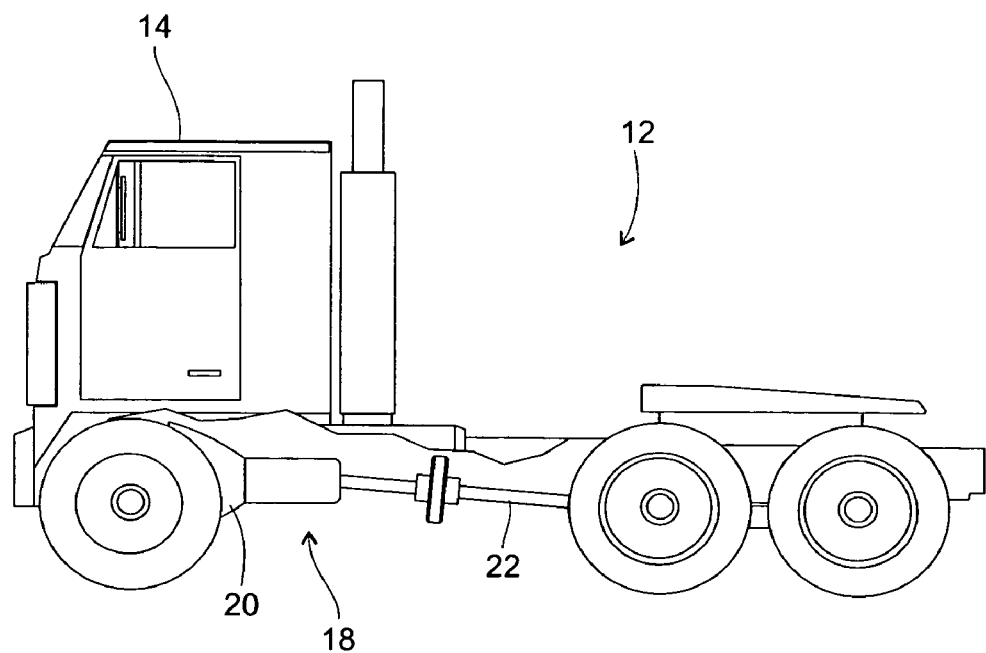
FIG. 3 is a side elevational view of the inertial-centrifugal drive system of the present invention illustrating the inertial-centrifugal drive system fitted onto the drive train of the tractor-trailer first shown in FIG. 1 as a retrofit.
Figure 4:
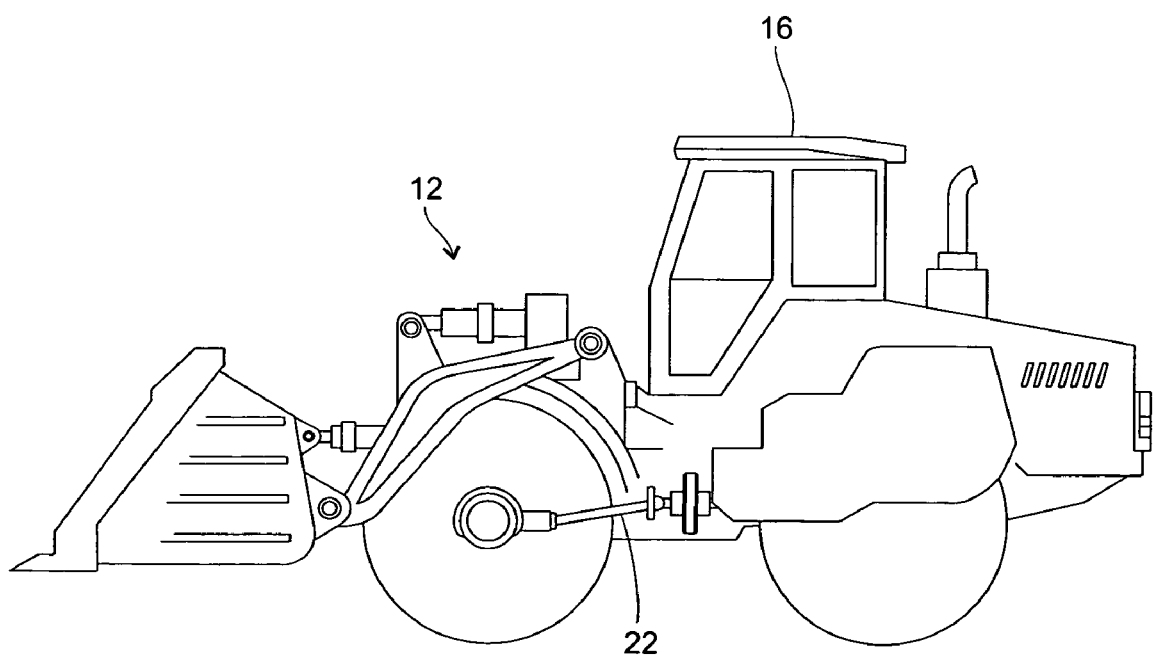
FIG. 4 is a side elevational view of the inertial-centrifugal drive system of the present invention illustrating the inertial-centrifugal drive system fitted onto the drive train of the front-end loader first shown in FIG. 2 in configuration different from that of FIG. 2.
Figure 5:
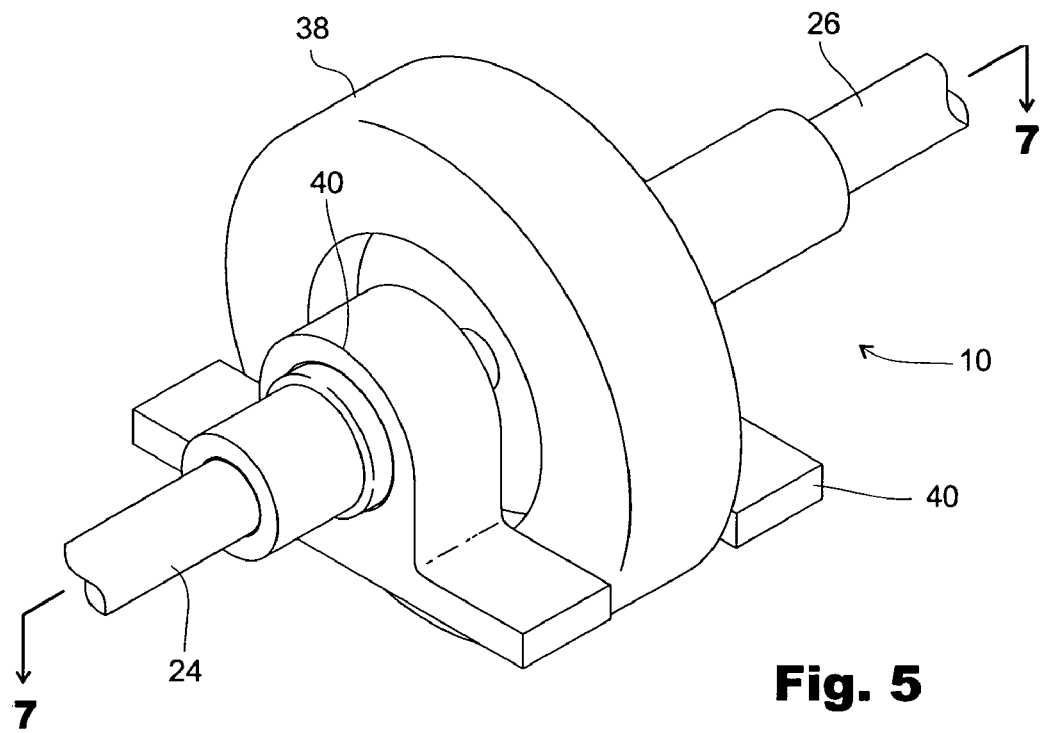
FIG. 5 is a perspective view of the inertial-centrifugal drive system of the present invention illustrating drive system mounted in-line with the main drive shaft and interconnecting the input shaft with the output shaft.
Figure 6:
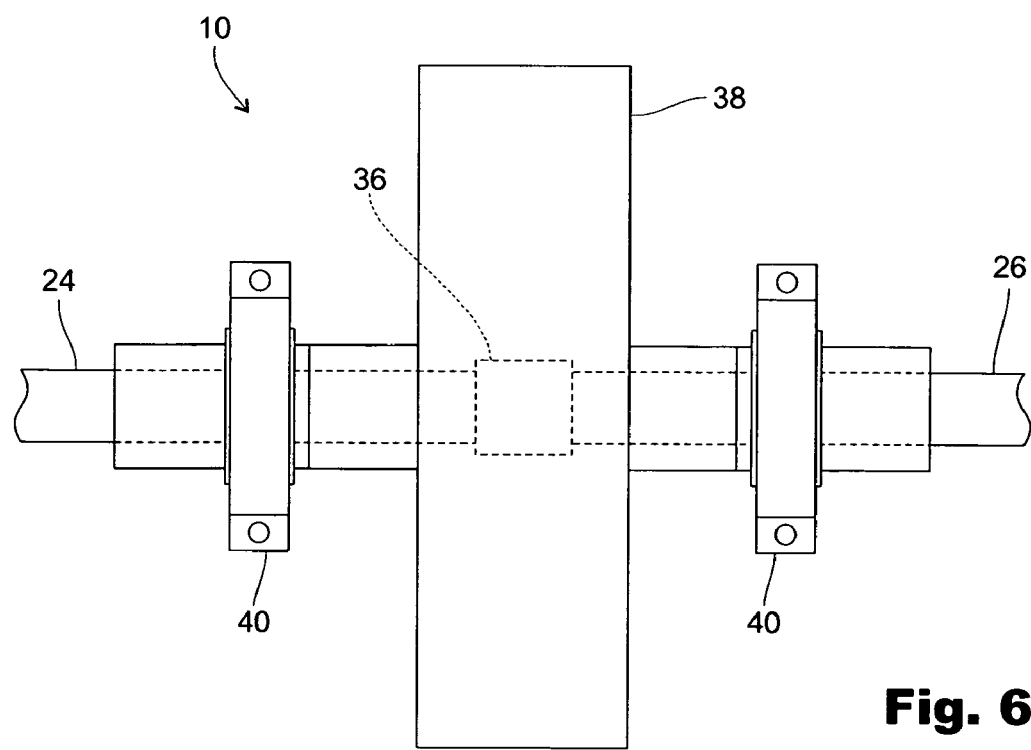
FIG. 6 is a top plan view of the inertial-centrifugal drive system of the present invention illustrating the location of the free-wheeling cam clutch bearing relative to the input shaft and the output shaft of the main drive shaft.
Figure 7:
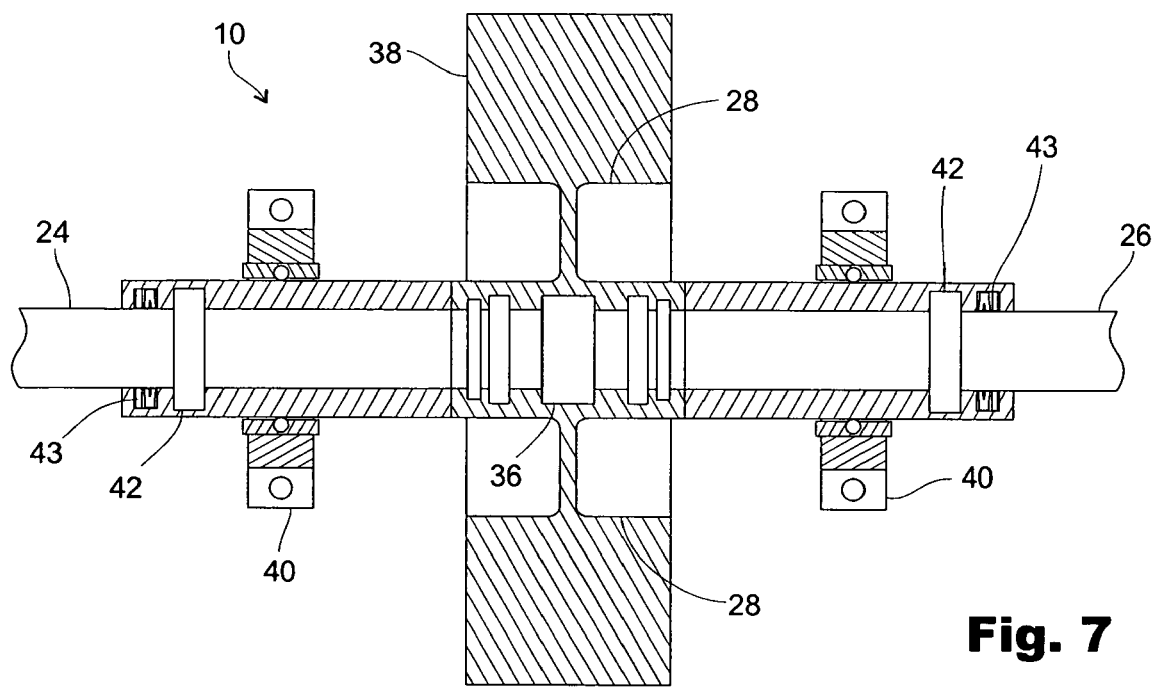
FIG. 7 is top plan view of the inertial-centrifugal drive system of the present invention illustrating the disposition of the flywheel relative to the main drive shaft and, further, the input shaft and the output shaft.
Figure 8:
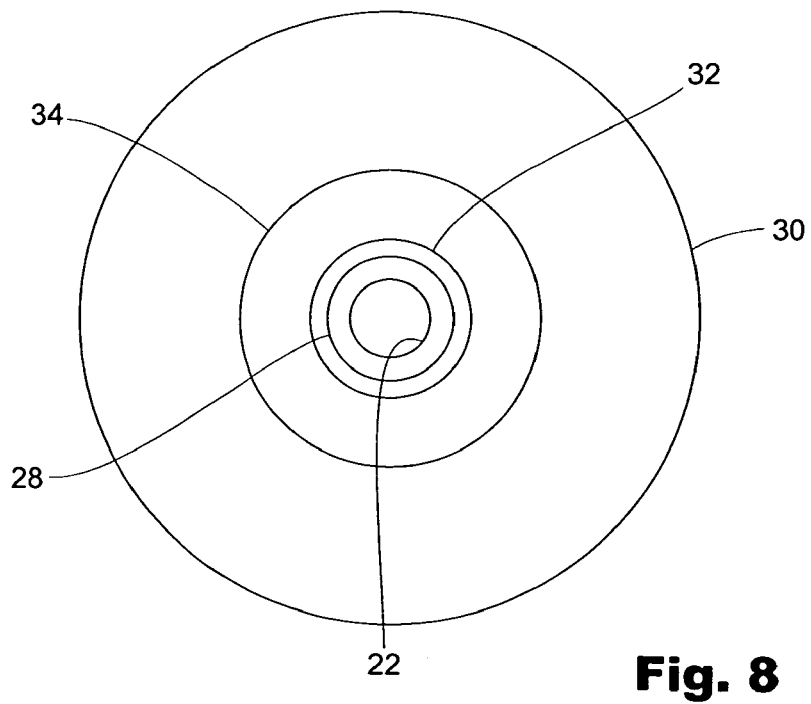
FIG. 8 is a front elevational view of the inertial-centrifugal drive system of the present invention illustrating the disposition of the free-wheeling cam clutch bearing and the flywheel.

Illustrated in FIGS. 1-14 is an inertial-centrifugal drive system 10 for any type of automotive vehicle or powered vehicle. The vehicle can range from cars to heavy construction equipment to mining equipment to military-type equipment. Representative vehicles 12 are shown in FIGS. 1-4 and include, but are not limited to, a tractor-trailer 14 and a front-end loader 16. Both vehicles 14 and 16 include a power unit 18 including a transmission unit 20 and a main drive train, and the main drive train includes a main drive shaft 22, with the main drive shaft 22 further comprising an input shaft 24 and an output shaft 26. The inertial-centrifugal drive system 10 of the present invention is preferably mounted on the main drive shaft 22 adjacent the area where the input shaft 24 interconnects to the output shaft 26; and, furthermore, the drive system 10 of the present invention can be retrofitted onto existing equipment or can be incorporated as part of the integral mechanical component on original pieces of equipment.

Thus, illustrated in FIGS. 1-14 is a flywheel 28 that is rotatably mounted to the main drive shaft 22 where the input shaft 24 interconnects to the output shaft 26. The flywheel 28 includes an outer rim section 30 containing most of the mass of the flywheel 28, a hub 32 for attachment to the main drive shaft 22 of the vehicle 12, and an inner web section 34 connecting the hub 32 to the outer rim section 30. A free-wheeling cam and clutch bearing 36 is mounted on the main drive shaft 22, and specifically at the interconnection of the input shaft 24 with the output shaft 26. The cam and clutch bearing 36 is selectively engagable to and disengagable from the main drive shaft 22 as driving and power requirements change and vary. Furthermore, the free-wheeling cam and clutch bearing 36 is encased within the hub 32 of the flywheel 28. It should be noted that the flywheel 28 and its component parts, as well as the free-wheeling cam and clutch bearing 36, are rotatably mounted to the main drive shaft 22 and are circumjacently oriented with respect thereto, and the flywheel 28 is encased in a flywheel housing 38. A pillow block bearing 40 is mounted on either side of the flywheel housing 38 with one pillow block bearing 40 for the input shaft 24 and one pillow block bearing 40 for the output shaft 26. Each pillow block bearing 40 houses or encases therein a bearing 42 mounted to that respective part of the main drive shaft 22, and also an oil seal 43 is circumjacently mounted to each respective part—input shaft 24 or output shaft 26—of the main drive shaft 22. The free-wheeling cam and clutch bearing 36 is selectively engagable to the main drive shaft 22 to assist in powering of the vehicle 12.

Figure 9:
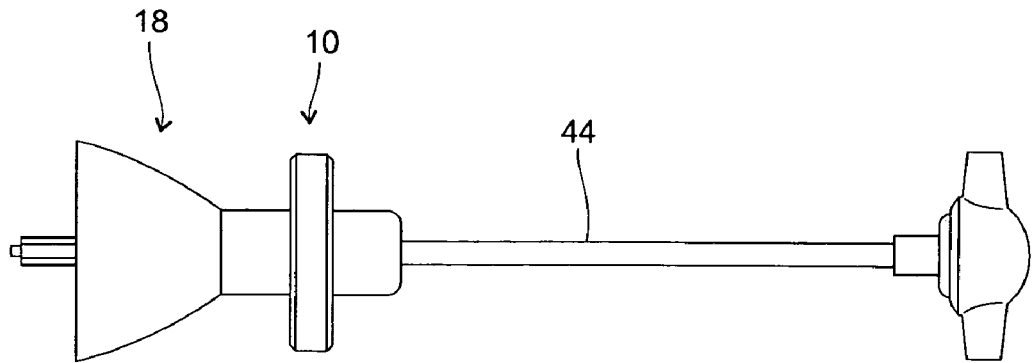
FIG. 9 is top plan view of the inertial-centrifugal drive system of the present invention illustrating one configuration or embodiment for a standard drive train system.
Figure 10:
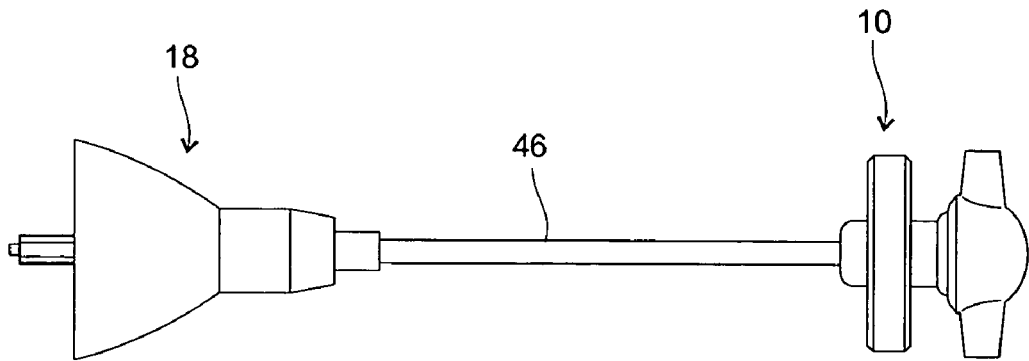
FIG. 10 is a top plan view of the inertial-centrifugal drive system of the present invention illustrating a second configuration or embodiment for a standard drive train system.
Figure 11:
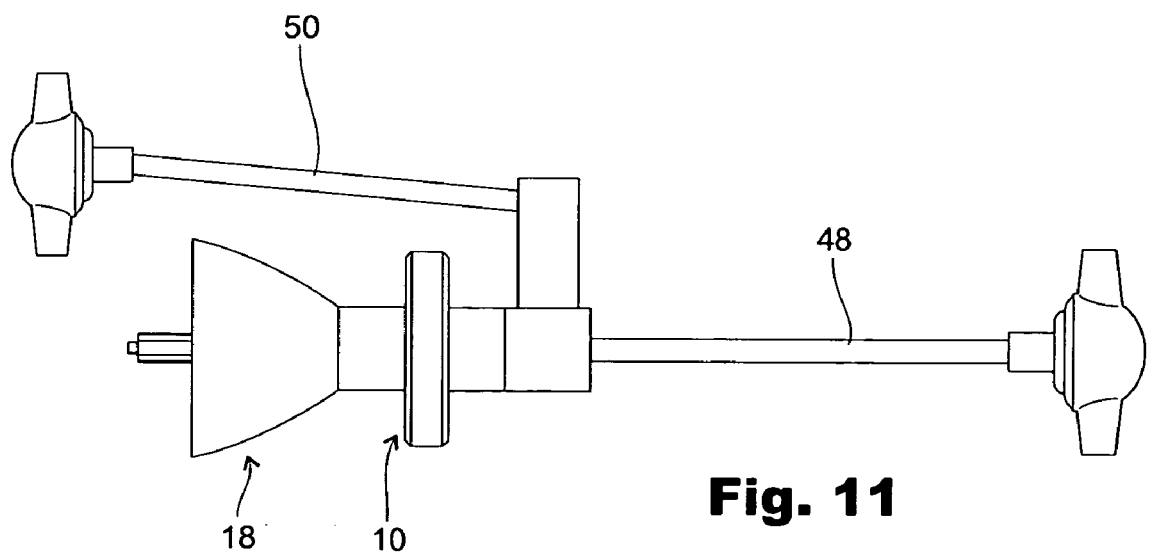
FIG. 11 is a top plan view of the inertial-centrifugal drive system of the present illustrating a third configuration or embodiment for the drive system incorporates a third configuration or embodiment for a standard drive train system.
Figure 12:
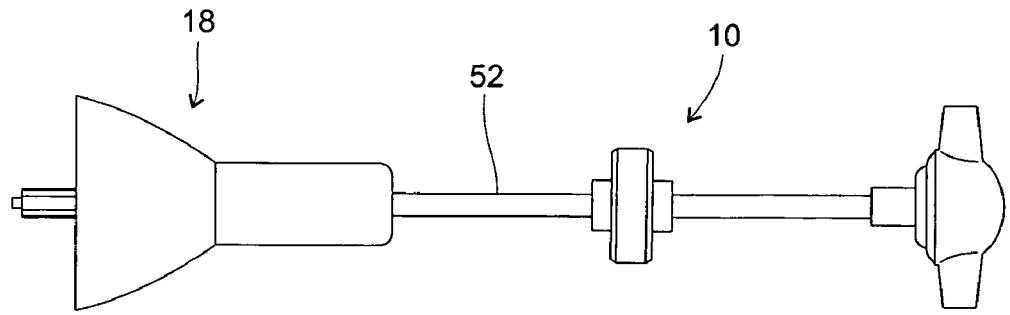
FIG. 12 is a top plan view of the inertial-centrifugal drive system of the present invention illustrating a first configuration or embodiment for the drive system incorporated into the main drive train of the vehicle.
Figure 13:
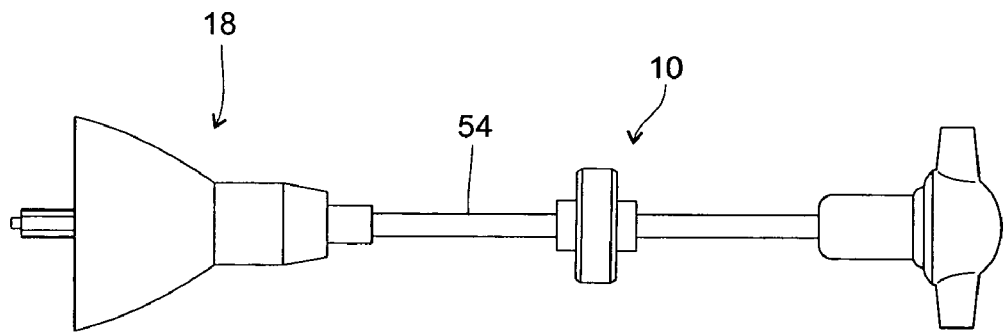
FIG. 13 is a top plan view of the inertial-centrifugal drive system of the present invention illustrating a second configuration or embodiment for the drive system incorporated into the main drive train of the vehicle.
Figure 14:
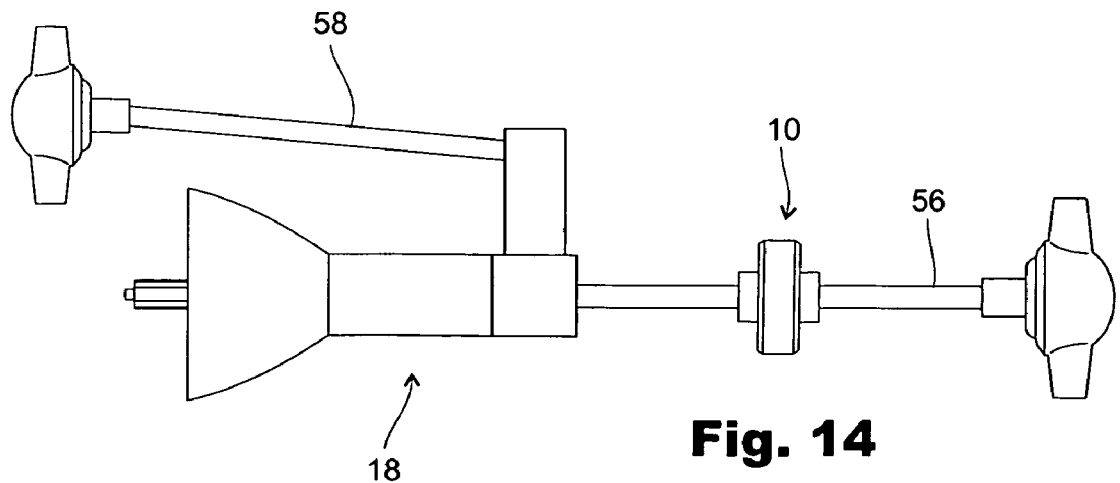
FIG. 14 is a top plan view of the inertial-centrifugal drive system of the present invention illustrating a third configuration or embodiment for the drive system incorporated into the main drive train of the vehicle.

FIGS. 9-14 illustrates various configurations or arrangements for the inertial-centrifugal drive system 10 of the present invention with regard to its being retrofitted to the power unit 18—the main drive train 22—as well as being incorporated as an integral and original part of the power unit 18. Thus, FIG. 9 illustrates a first configuration or arrangement for the drive system 10 mounted to a main drive train 44 of a power unit as an integral part thereof. FIG. 10 illustrates a second configuration or arrangement for the drive system 10 mounted to a main drive train 46 of a power unit as an integral component thereof. FIG. 11 illustrates the drive system 10 mounted to a main drive train 48 of a power unit, and the main drive train 48 including an auxiliary drive train 50. FIG. 12 illustrates the drive system 10 mounted on a main drive train 52 of a power unit as a retrofit component; FIG. 13 illustrates the drive system 10 mounted on a main drive train 54 of a power unit having a configuration different from the drive train of FIG. 12; and FIG. 14 illustrates the drive system 10 mounted to a main drive train 56 of a power unit that includes an auxiliary drive train 58 for the power unit. It should be noted that when the inertial centrifugal drive system 10 is installed on large gear box reductions, the free wheeling cam clutch bearing 36 will disengage if the gear box should lock up, and thereby avoid causing additional damage. In addition, when the inertial centrifugal drive system 10 is installed on equipment containing a shear pin on the flywheel, the shear pin can be eliminated and the free wheeling cam clutch bearing will disengage in the event of system failure.

A preferred embodiment, and several alternative embodiments, for the invention have been disclosed herein, and it should be understood that numerous modifications, alterations, and variations are possible and practicable to those skilled in the art while still remaining within the ambit and spirit of the invention and the scope of the invention as set forth by the appended claims.

I claim:

1. An inertial-centrifugal drive system for the power unit of a vehicle, comprising:
   a flywheel rotatably mounted to the main drive shaft of the vehicle;
   the flywheel including an outer rim section, an inner web section, and a hub;
   a flywheel housing for containing and enclosing therein the flywheel;
   a free-wheeling cam and clutch bearing rotatably mounted to the main drive shaft and enclosed within the hub of the flywheel;
   a pair of pillow blocks with one pillow block mounted on one side of the flywheel and the other pillow block mounted on the other side of the flywheel;
   each pillow block including a bearing and an oil seal; and
   the free-wheeling cam and clutch bearing selectively engagable to and disengagable from the main drive shaft so that the free-wheeling cam and clutch bearing drives in the same rotational direction as the power unit, free wheels when the vehicle is in braking mode and operating in the reverse direction, and does not interfere with the deceleration of the vehicle.

2. The inertial-centrifugal drive system of claim 1 wherein the inertial-centrifugal drive system can be retrofitted to the power unit of the vehicle.

3. The inertial-centrifugal drive system of claim 2 wherein the inertial-centrifugal drive system can be incorporated as an integral part of the power unit and transmission unit of the vehicle.

4. The inertial-centrifugal drive system of claim 3 wherein the installation of the inertial-centrifugal drive system on large gear box reductions allows for the disengagement of the free-wheeling cam clutch bearing if the gear box locks up thereby avoiding causing additional damage to the power unit of the vehicle.

5. The inertial-centrifugal drive system of claim 4 wherein the installation of the inertial-centrifugal drive system on power units having shear pins allows the shear pin to be eliminated so that the free-wheeling cam clutch bearing can disengage in the event of the failure of the power unit of the equipment.

* * * * *